United States Patent [19]
Asou et al.

[11] Patent Number: 6,120,370
[45] Date of Patent: Sep. 19, 2000

[54] VEHICLE AIR CONDITIONING APPARATUS

[75] Inventors: Hiroshi Asou; Katsumi Sakane, both of Hiroshima; Shintaro Hosoda, Kure, all of Japan

[73] Assignee: Mazda Motor Corporation, Hiroshima, Japan

[21] Appl. No.: 09/251,416

[22] Filed: Feb. 17, 1999

[30] Foreign Application Priority Data

Mar. 13, 1998 [JP] Japan .................................. 10-063610

[51] Int. Cl.⁷ ..................................................... B60H 1/00
[52] U.S. Cl. .......................... 454/137; 454/144; 62/244; 165/42; 165/43
[58] Field of Search .................. 165/42, 43; 62/244; 454/137, 144, 152, 108

[56] References Cited

U.S. PATENT DOCUMENTS 4,252,053  2/1981  Muto et al. .
4,432,213  2/1984  Katahira et al. ........................ 62/244 X
5,803,166  9/1998  Ito et al. ................................ 165/42 X

FOREIGN PATENT DOCUMENTS 57-144118  9/1982  Japan .

Primary Examiner—Henry Bennett
Assistant Examiner—Chen Wen Jiang

[57] ABSTRACT

A vehicle air conditioning apparatus, provided in a vehicle where plural rows of seats are arrayed in the front-to-rear direction of the vehicle, comprises a cooler duct for guiding cool air from a cooler unit of an air conditioning unit to a portion above and between a first rear seat positioned on a second row of seats from a vehicle front and a second rear seat positioned behind the first rear seat. The cooler duct has a first outlet for ejecting cool air to the first rear seat side and a second outlet for ejecting cool air to the second rear seat side, and the first outlet is arranged in a position away from a seated portion of the first rear seat.

13 Claims, 11 Drawing Sheets

FIG. 11
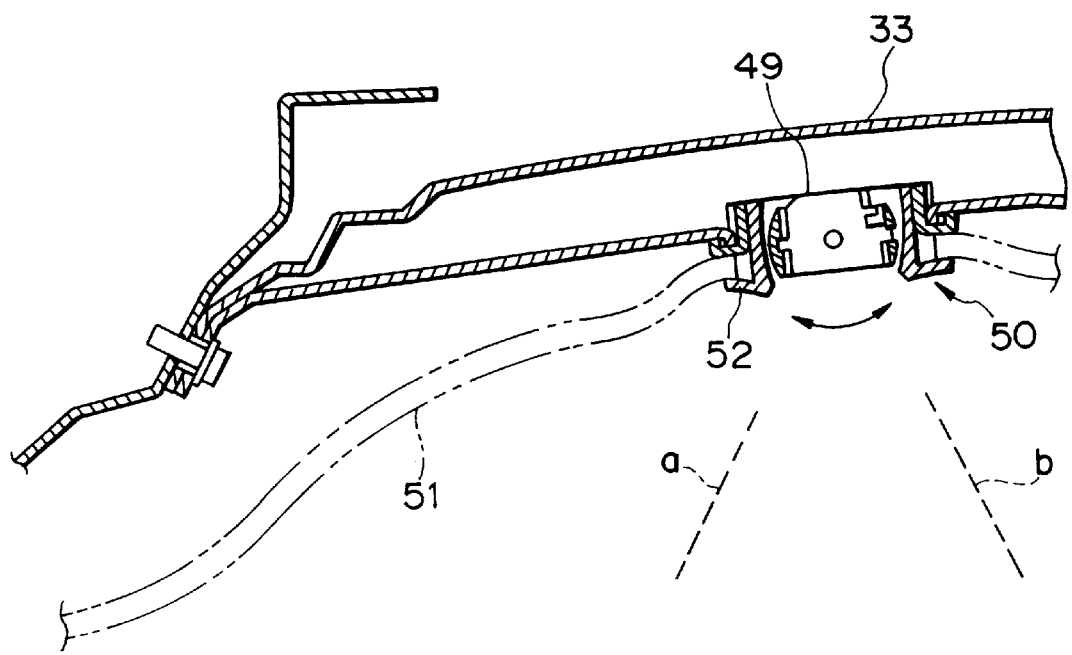

VEHICLE AIR CONDITIONING APPARATUS

BACKGROUND OF THE INVENTION

The present invention relates to a vehicle air conditioning apparatus for, e.g., efficiently cooling the rear portion of a vehicle interior.

Japanese Patent Application Laid-Open No. 57-144118 discloses a cooler system in which cool air from a cooler unit provided in the rear portion of a vehicle interior is guided by a cooler duct having a vertical portion extended upward along a pillar and a horizontal portion extended from the top end of the vertical portion in the vehicle width direction, and the cool air is ejected from outlets, formed respectively on the front and back surfaces of the horizontal portion, to the back of a first rear seat positioned on the second row of seats from the vehicle front and the front portion of a second rear seat positioned in the last row of seats.

However with the construction where cool air is ejected to the back of the first rear seat positioned on the second row of seats from the vehicle front, the cool air is directly ejected to the back of the head of the passengers seated on the first rear seat, resulting in a problem of passenger's uncomfortable feeling due to the localized cooling.

In order to prevent such uncomfortable feeling of a passenger due to the localized air flow, ejected to the back of the first rear seat positioned on the second row of seats from the front (hereinafter referred to as "uncomfortable feeling"), for instance, Japanese Utility Model Application Laid-Open No. 60-45210 discloses a cooler system providing two rows of roof ducts which are extended in the vehicle width direction along the roof panel of the vehicle interior for respectively ejecting cool air to the front portion of passengers seated on the aforementioned first and second rear seats from air outlets formed on the back wall surface of the roof ducts. However with such construction, two rows of roof ducts must be formed along the roof panel, resulting in a complicated structure of a cooler duct.

SUMMARY OF THE INVENTION

The present invention is made in consideration of the above situation, and has as its object to provide a vehicle air conditioning apparatus capable of uniformly cooling a wide area of the rear portion of a vehicle interior with a simple construction, without causing the aforementioned "uncomfortable feeling."

In order to solve the foregoing problems, according to a first aspect of a vehicle air conditioning apparatus of the present invention, the vehicle air conditioning apparatus provided in a vehicle where plural rows of seats are arrayed in a front-to-rear direction of the vehicle, is characterized by comprising a cooler duct for guiding cool air from a cooler unit of an air conditioning unit to a portion above and between a first rear seat positioned on a second row of seats from a vehicle front and a second rear seat positioned behind the first rear seat, wherein a first outlet for ejecting cool air to the first rear seat side and a second outlet for ejecting cool air to the second rear seat side are formed on the cooler duct, and the first outlet is arranged in a position away from a seated portion of the first rear seat.

According to the aforementioned first aspect of the present invention, cool air from the cooler unit is guided to a portion above and between the first rear seat and the second rear seat through the cooler duct, and ejected from the first and second outlets. By virtue of this construction, the rear portion of the vehicle interior can be efficiently cooled while avoiding direct ejection of cool air to the back of the head of a passenger who is seated on the first rear seat.

According to a second aspect of the present invention, the vehicle air conditioning apparatus according to the aforementioned first aspect is characterized in that the first rear seat is a separate type seat in which left and right seats are independent, and the first outlet is arranged in a central portion of the cooler duct in a vehicle width direction.

According to the second aspect of the present invention, cool air is ejected from the first outlet, formed on the cooler duct, to the middle of the first rear seat in its rear surface side, wherein the first rear seat is provided on the left and right separately. Therefore, the rear portion of the vehicle interior can be efficiently cooled while avoiding direct ejection of cool air to the back of the head of the passenger seated on the first rear seat provided on the left and right separately.

According to a third aspect of the present invention, the vehicle air conditioning apparatus according to the first or the second aspects is characterized in that the second outlet for ejecting cool air to a front surface side of the second rear seat situated in a last row of seats in the vehicle is arranged in the central portion of the cooler duct in the vehicle width direction.

According to the third aspect of the present invention, cool air is ejected from the second outlet, formed on the cooler duct, to the middle of the second rear seat in its front surface side. By virtue of this construction, cool air is ejected to the passengers' front side on the second rear seat, and the rear portion of the vehicle interior can be efficiently cooled. Cool air may be ejected directly to the face of the passenger seated on the second rear seat. However, such air positively provides comfortable cool air to passengers and can improve passengers' comfort.

According to a fourth aspect of the present invention, the vehicle air conditioning apparatus according to any one of the first to third aspects is characterized in that a defroster outlet ejecting cool air to a side window is formed on the roof duct.

By virtue of the fourth aspect of the present invention, cool air ejection to the side window from the defroster outlet formed on the cooler duct can efficiently defrost the side window.

According to a fifth aspect of the present invention, the vehicle air conditioning apparatus according to any one of the first to fourth aspects is characterized in that the cooler duct comprises: a vertical duct extended upward from the cooler unit; a side duct extended forward to a front side of the vehicle from a top end of the vertical duct; and a roof duct extended in the vehicle width direction from a front end of the side duct.

According to the fifth aspect of the present invention, cool air from the cooler unit passes through the vertical duct to the top portion of the vehicle, then is guided through the side duct toward the vehicle front, and further guided in the vehicle width direction along the lower surface of the roof panel through the roof duct which is arranged above and between the first rear seat and the second rear seat in the vehicle end. The cool air is ejected from the first and second outlets, formed on the central portion of the roof duct in the vehicle width direction, to the rear surface of the first rear seat and the front surface of the second rear seat. By virtue of this, the rear portion of the vehicle interior can be efficiently cooled with a simple construction of the cooling system.

According to a sixth aspect of the present invention, the vehicle air conditioning apparatus according to any one of the first to fifth aspects is characterized in that the vertical duct is arranged along the most rear pillar.

According to the sixth aspect of the present invention, the vertical duct is arranged along the pillar provided in the most rear of the vehicle so that the view of the passengers seated on the rear seats are not largely affected. Therefore, the opening area of the vertical duct can be enlarged while securing enough width for the vertical duct, and as a result, the flow resistance of the cool air can be reduced without interfering with the passengers' view.

According to a seventh aspect of the present invention, the vehicle air conditioning apparatus according to the sixth aspect is characterized in that the air conditioning unit is arranged between the lower portion of the pillar and a wheel housing of a rear wheel.

According to the seventh aspect of the present invention, since the air conditioning unit is arranged between the lower portion of the pillar provided in the most rear of the vehicle and the wheel housing of the rear wheel, it is possible to secure space for providing a rear door in front of the air conditioning unit.

According to an eighth aspect of the present invention, the vehicle air conditioning apparatus according to the seventh aspect is characterized in that a slide-type rear door is provided in front of the air conditioning unit.

According to the eighth aspect of the present invention, an opening portion for providing a slide door having a large open area is formed in front of the air conditioning unit. By virtue of this construction, passengers on the rear seats can easily get on or off the vehicle using the large open area.

According to a ninth aspect of the present invention, the vehicle air conditioning apparatus according to the eighth aspect is characterized in that the air conditioning unit further comprises a heater unit and a heater duct for guiding heated air from the heater unit to the central portion in the vehicle width direction.

According to the ninth aspect of the present invention, heated air from the heater unit is guided to the central portion in the vehicle width direction and ejected to the vehicle interior. Therefore, the rear portion of the vehicle interior can be efficiently heated.

According to a tenth aspect of the present invention, the vehicle air conditioning apparatus according to the ninth aspect is characterized in that the heater duct is extended in the vehicle width direction, while passing under the rear seat situated in the last row of seats in the vehicle, and an outlet for ejecting heated air upward from the vehicle floor is provided to the heater duct.

According to the tenth aspect of the present invention, heated air from the heater unit passes under the rear seat situated in the last row of seats in the vehicle and is guided to the central portion of the vehicle in the vehicle width direction, then ejected upward from the outlet formed on the floor portion of the vehicle interior. Therefore, the rear portion of the vehicle interior can be efficiently heated.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 11 is a cross section of FIG. 10 cut along the line D—D;

DETAILED DESCRIPTION OF THE PREFERRED EMBODIMENTS

Preferred embodiments of the present invention will be described in detail in accordance with the accompanying drawings.

Figure 1:
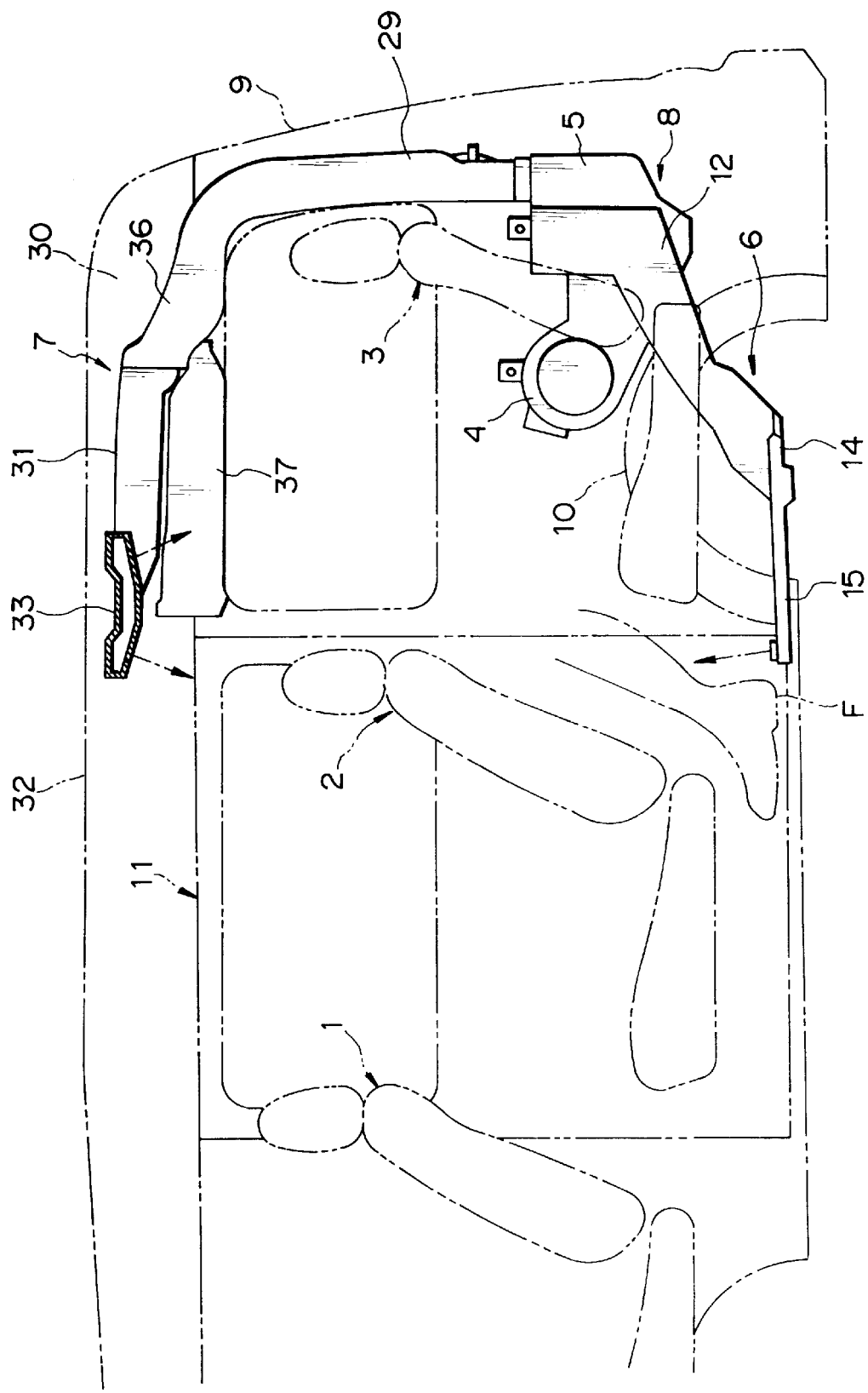
FIG. 1 is an illustration showing a vehicle air conditioning apparatus according to the present embodiment.

As shown in FIG. 1, the vehicle air conditioning apparatus according to the present embodiment (hereinafter referred to as the air conditioning apparatus) is formed in a box-type vehicle comprising: a front seat 1 consisting of a driver's seat and a passenger's seat; a separate-type first rear seat 2 having left and right independent seats, positioned behind the front seat 1; and a bench-type second rear seat 3 positioned behind the first rear seat 2. In the vehicle, these three rows of seats are arrayed in the front-to-rear direction of the vehicle.

The air conditioning apparatus comprises: a heater unit 4 including a floor and a heater core; a cooler unit 5 including an evaporator and an air mixer; a heater duct 6 for guiding heated air from the heater unit 4; and a cooler duct 7 for guiding cool air from the cooler unit 5. The heater unit 4 and cooler unit 5 integrally constitute an air conditioning unit 8. The air conditioning unit 8 is provided in the right side of the second rear seat 3 in the last row of seats in the vehicle interior, between the lower portion of so-called D-pillar 9 provided in the most rear of the vehicle and a wheel housing 10 of the right rear wheel. In front of the air conditioning unit 8, a slide-type rear door 11 is provided.

Figure 2:
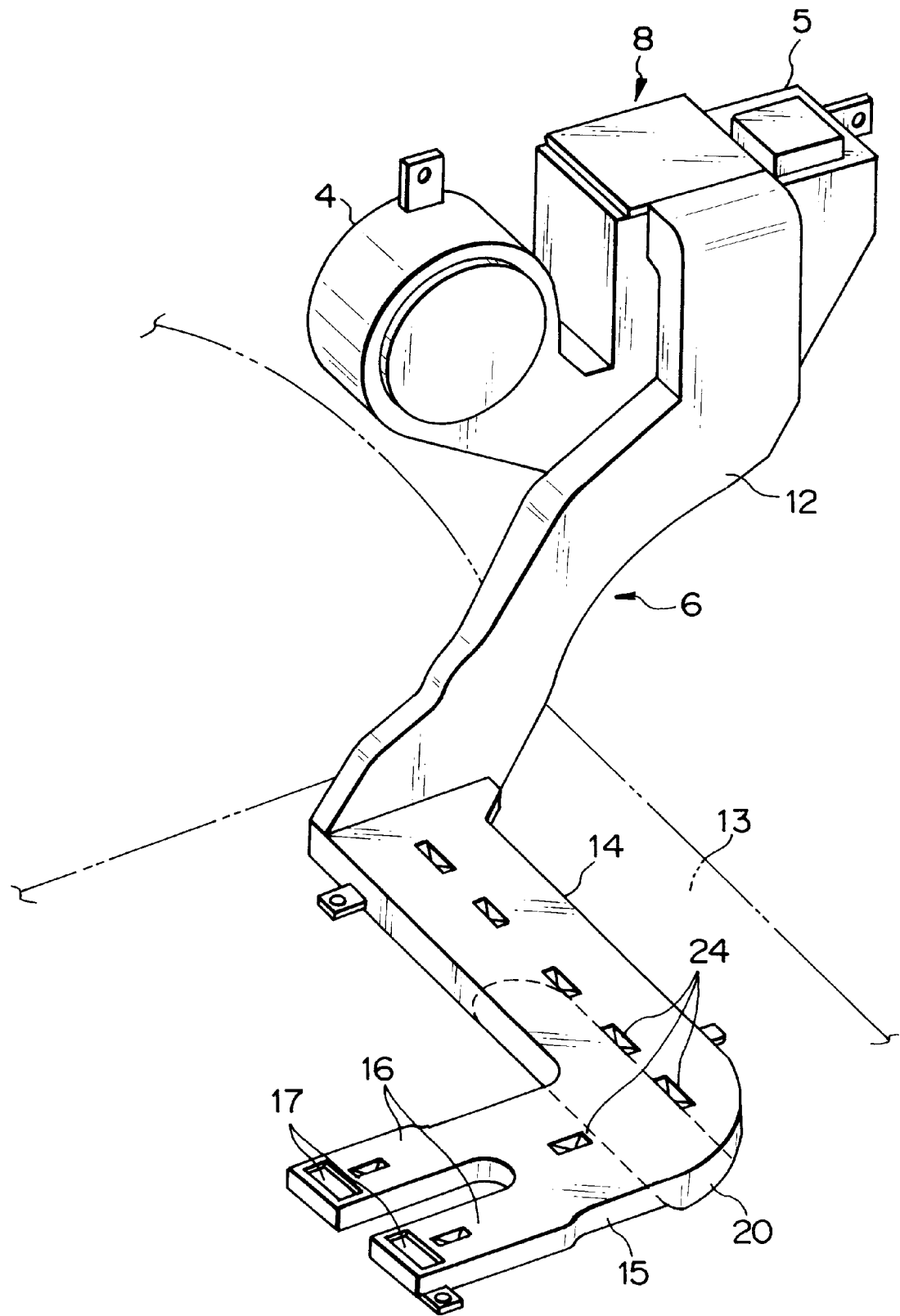
FIG. 2 is a perspective view of a heater unit and a heater duct.
Figure 3:
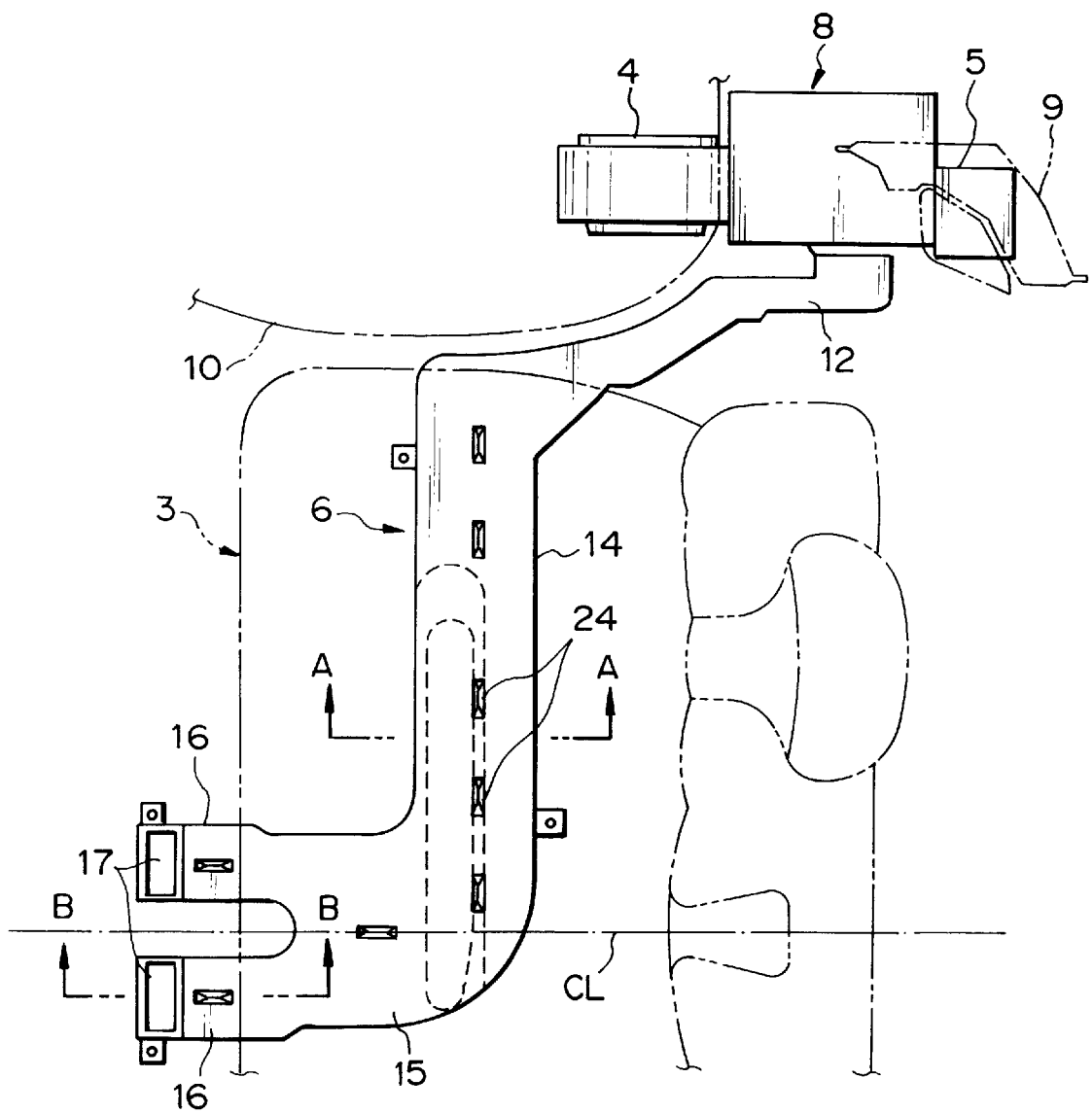
FIG. 3 is a plan view of the heater unit and the heater duct.

As shown in FIGS. 2 and 3, the heater duct 6 is provided along the side wall of the vehicle, with a forward inclination. The heater duct 6 comprises: a first duct 12 extended downward to the lower portion of the vehicle; a second duct 14 extended along the top surface of a floor panel 13, from the bottom end of the first duct 12 to the central portion of the vehicle in the vehicle width direction; and a third duct 15 extended from the end portion of the second duct 14 toward the front portion of the vehicle.

The third duct 15 has, in its front half portion, a pair of branching parts 16 provided symmetrically along the center line CL (FIG. 3) passing the center of the vehicle width. The branching parts 16 are extended forward, slightly further than the front end of the second rear seat 3. On the upper surface of the end of each branching part 16, an outlet 17 for ejecting heated air is formed so that heated air is ejected upward from the floor in the rear portion of the vehicle.

Figure 4:
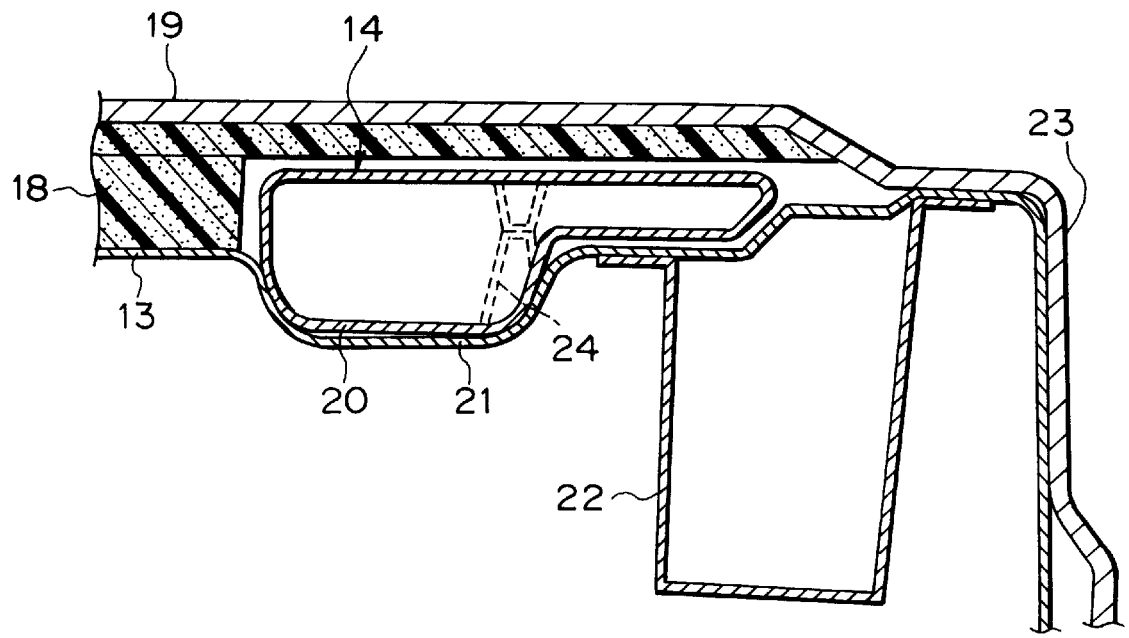
FIG. 4 is a cross section of FIG. 3 cut along the line A—A.
Figure 5:
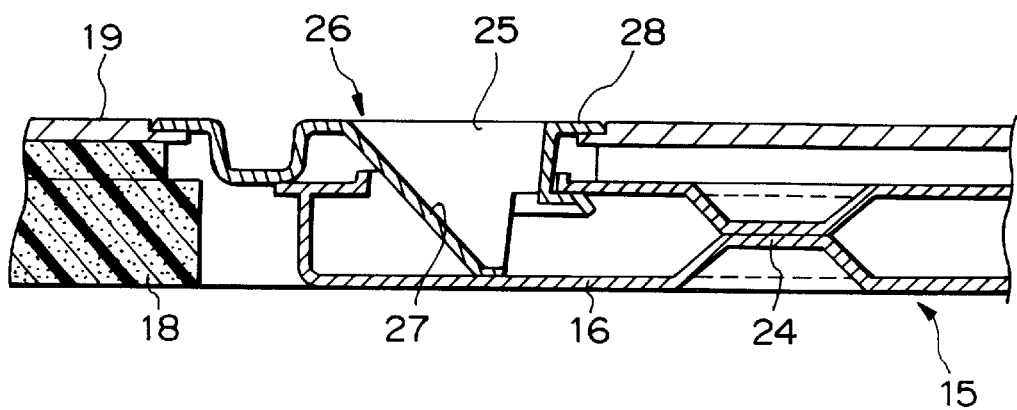
FIG. 5 is a cross section of FIG. 3 cut along the line B—B.

On the upper surface of the floor panel 13 a soundproof member 18 made of, e.g., felt, urethane foam, polyethylene foam, glass wool or the like, is provided as shown in FIGS. 4 and 5. In the cut formed in the soundproof member 18, the second duct 14 and the third duct 15 of the heater duct 6 are situated. Since the second and third ducts 14 and 15 are buried in the soundproof member 18 and a rug 19 such as a carpet or a mattress or the like is spread on top of the surface, a flat floor surface is formed.

The second duct 14 of the heater duct 6 includes an expanded portion 20 formed by expanding downward the front half of the bottom wall of the duct 14. On the floor panel 13, a recess 21 is formed to house the expanded portion 20. Behind the second duct 14, a cross member 22 extended in the vehicle width direction and a hollow 23 having a predetermined width and protruded downward are provided. The hollow 23 is large enough to house the second rear seat 3 when the seat back of the second rear seat 3 is folded down on the seat bottom of the second rear seat 3 and the entire seat is pushed back. On the right side of the hollow 23, the air conditioning unit 8 is situated.

The second duct 14 and the third duct 15 of the heater duct 6 have a plurality of reinforcement portions 24 to prevent deformation. The reinforcement portions 24 are formed by concaving the upper and bottom walls of the second and third ducts 14 and 15 toward the inner portion of the duct, and connecting each of these concave ends. In order not to obstruct the flow of the heated air passing through the second and third ducts 14 and 15, the size of the reinforcement portions in the duct-width direction is formed smaller than the size in the duct-length direction.

Figure 6:
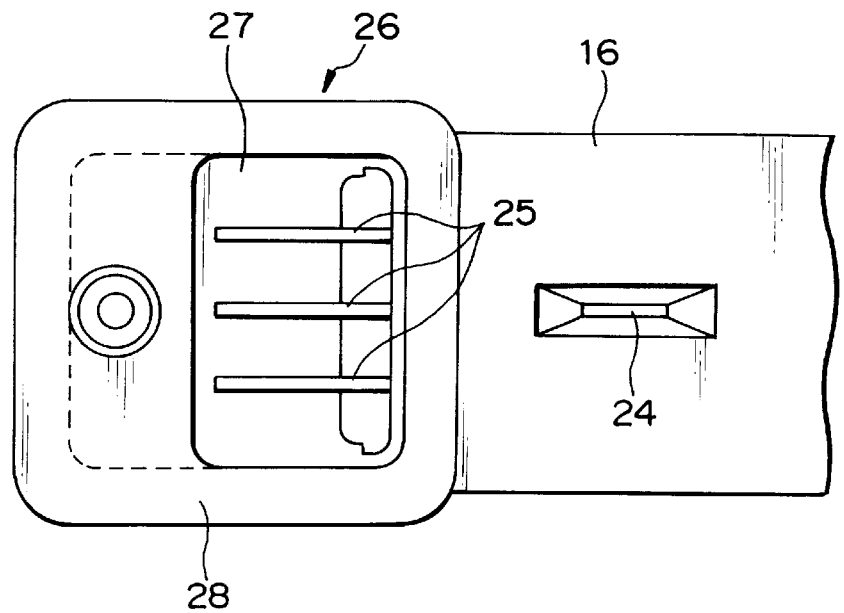
FIG. 6 is a plan view of a grille provided to the outlet of the heater duct.

At the outlet of the heater duct 6, a grille 26 having a plurality of reinforcement ribs 25 which are extended in the front-to-rear direction of the vehicle are formed as shown in FIGS. 5 and 6. In the front end of the grille 26, a guidance plate 27 is provided for guiding heated air upward at an angle toward the feet of passengers seated on the second rear seat 3. Moreover, on the periphery of the grille 26, a flange 28 which is pressed against the top surface of the rug 19 is formed. The flange 28 is secured with the periphery of the grille-placing hole formed on the rug 19, thereby concealing the grille 26.

As shown in FIG. 1, the cooler duct 7 which guides cool air from the cooler unit 5 comprises: a vertical duct 29 extended upward from the cooler unit 5 along the D pillar 9 provided in the most rear of the vehicle; a side duct 31 extended from the top end of the vertical duct 29 to the front side of the vehicle interior along a roof side portion 30 of the vehicle body; and a roof duct 33 extended from the front end of the side duct 31 to the vehicle width direction along the lower surface of the roof panel 32. The roof duct 33 is provided above and between the first rear seat 2 situated behind the front seat 1 and the second rear seat 3 situated behind the first rear seat 2.

Figure 7:
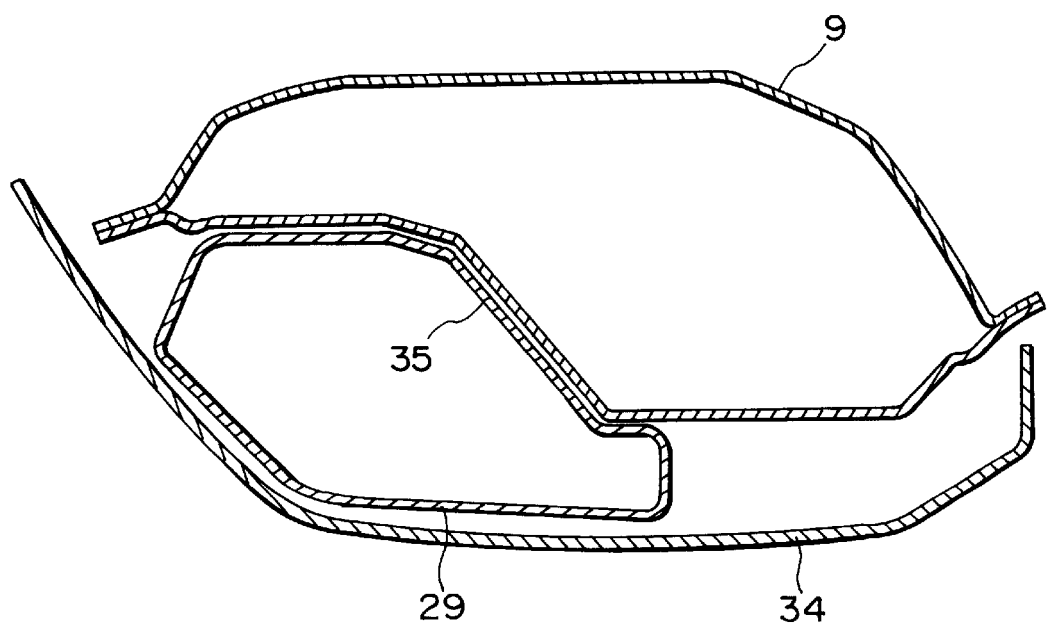
FIG. 7 is a cross section showing an arrangement of a cooler duct.

As shown in FIG. 7, the vertical duct 29 is arranged along the internal wall surface of the D pillar 9 positioned in the most rear of the vehicle, and the internal wall surface of the vertical duct 29 is covered with trim material 34 arranged inside the vehicle. The front side of the internal wall surface of the D pillar 9 has a dented portion 35 dented outward. The vertical duct 29 arranged along the dented portion 35 of the D pillar 9 is fixed with a fixing member such as a grip clamp or a screw or the like.

Figure 8:
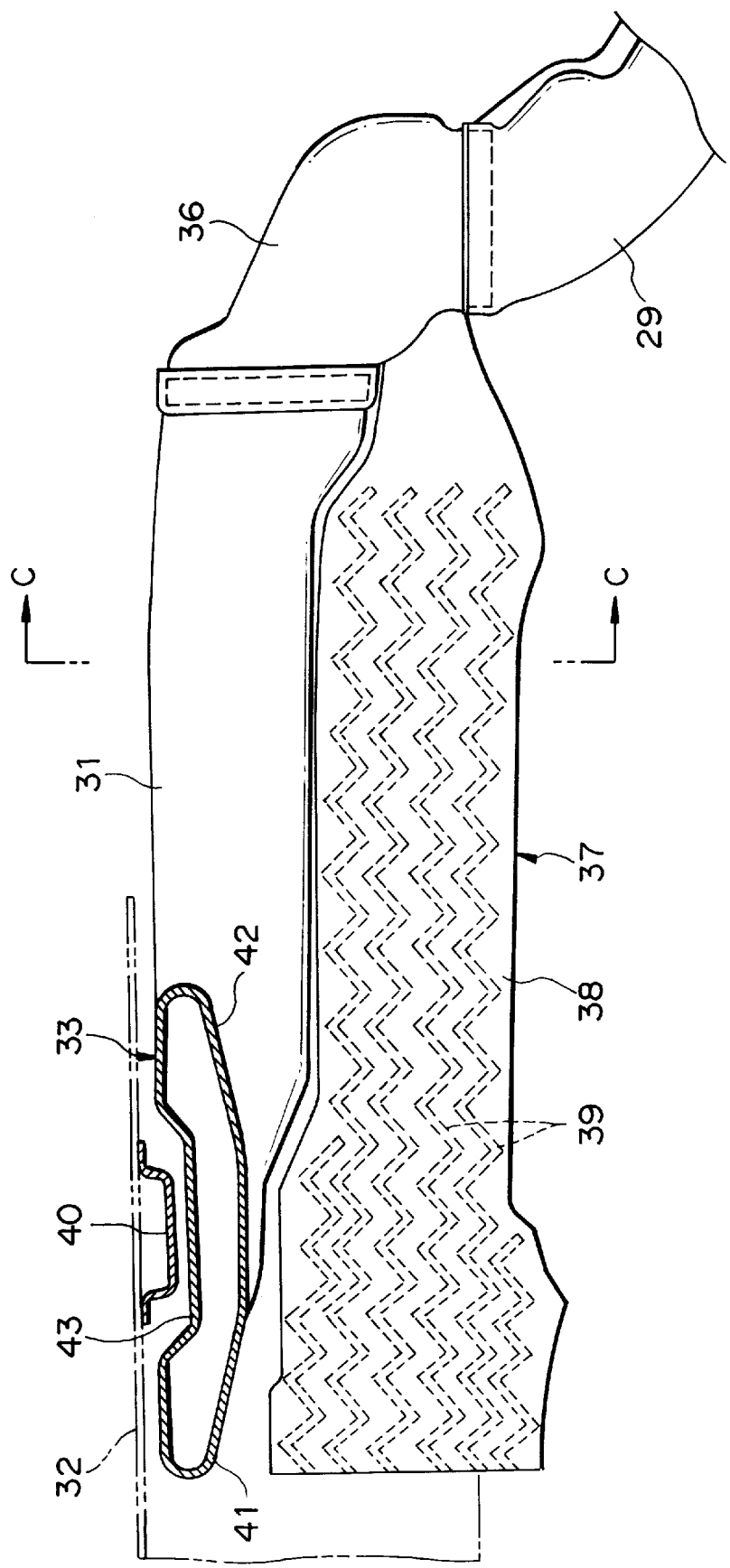
FIG. 8 is a side view showing an arrangement of the cooler duct.
Figure 9:
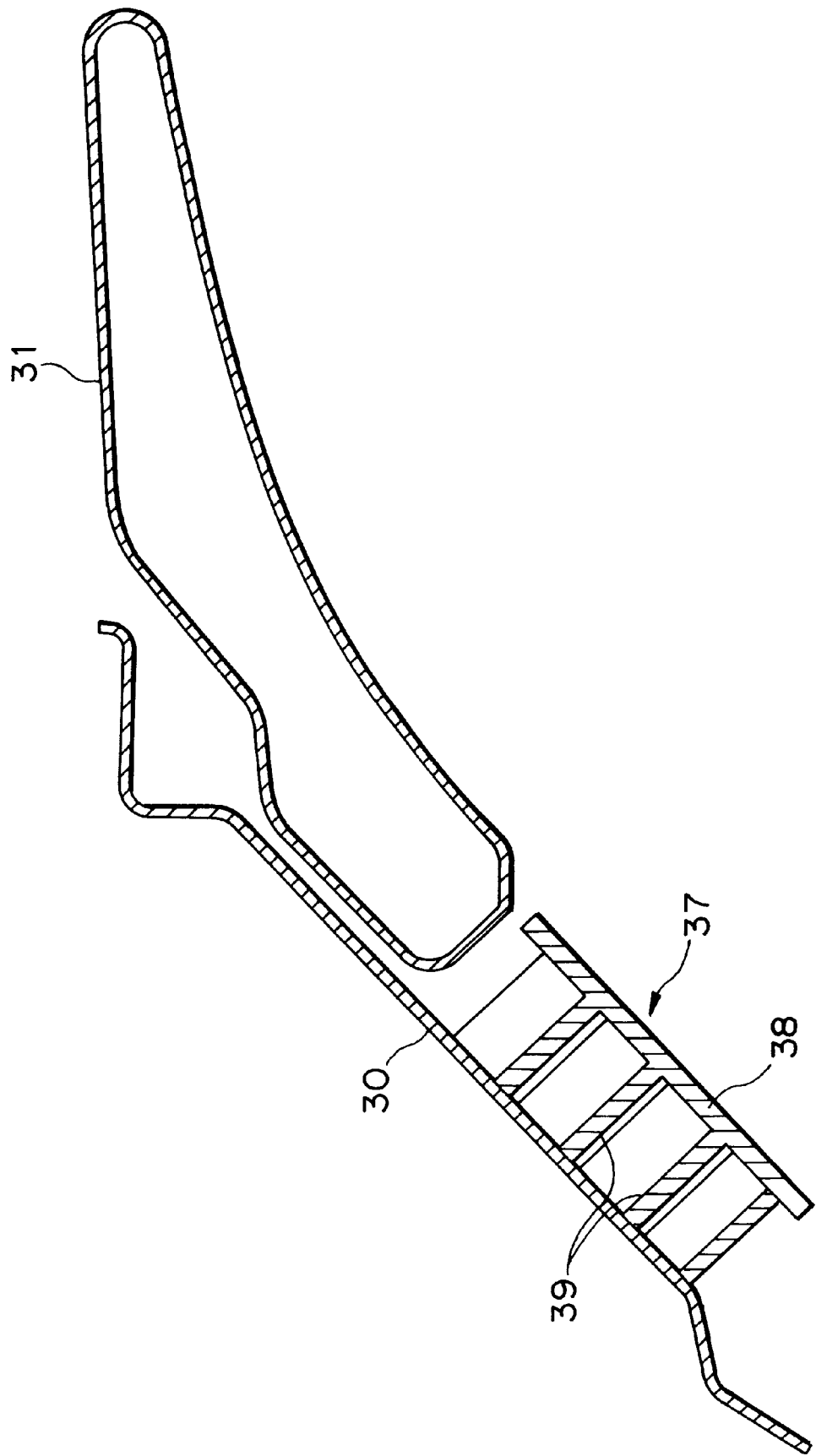
FIG. 9 is a cross section of FIG. 8 cut along the line C—C.

As shown in FIGS. 8 and 9, between the top end of the vertical duct 29 and the back end of the side duct 31, a connection duct 36 whose end portions are inserted in the vertical duct 29 and the side duct 31 respectively, is provided. In the vehicle front side of the connection duct 36, a side surface protection member 37 made of plastic or the like is provided.

The side surface protection member 37 comprises: a side surface plate 38 having a predetermined width, which extends forward to the vehicle front along the bottom wall surface of the side duct 31 and along the internal wall surface of the roof side portion 30; and a jagged rib plate 39 projected from the outer surface of the side surface plate 38. In a case of side collision of the vehicle, if for instance a passenger hits his head on the side surface plate 38, the rib plate 39 is pressed against the roof side portion 30 of the vehicle and is resiliently deformed, so as to absorb the shock on the passenger's head and protect the passenger.

Under the roof panel 32, as shown in FIG. 8, a roof reinforcement 40 having a shape of an upside-down hat when seen cross-sectionaly, extended in the vehicle width direction, is arranged. The roof duct 33 has a flat cross-sectional surface, and comprises a first expanded portion 41 expanded forward to the vehicle member including the roof reinforcement 40, and a second expanded portion 42 expanded backward. The top wall surface of the roof duct 33 has a concave portion 43 concaved downward in the middle according to the concave portion of the roof reinforcement 40.

Figure 10:
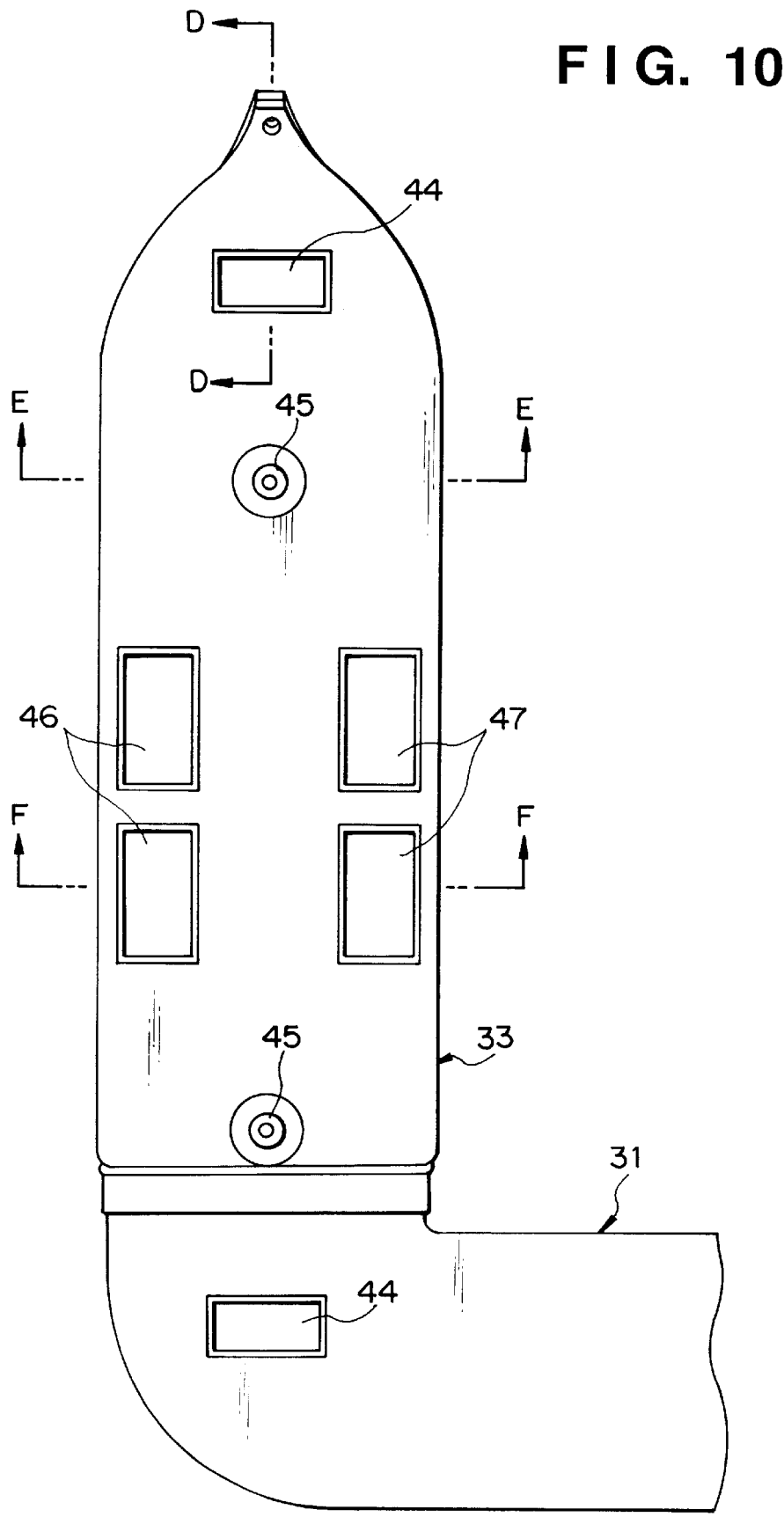
FIG. 10 is a bottom view of a roof duct.

On the bottom wall surface of the roof duct 33, defroster outlets 44 are formed in both left and right sides of the vehicle width direction as shown in FIG. 10. In the inner side of the defroster outlets 44, fixing portions 45 are provided to fix the roof duct to the vehicle body member. On the bottom wall surface of the roof duct 33, a pair of first outlets 46 and a pair of second outlets 47, each provided for the left and right first rear seat 2, are formed. The first outlets 46 and the second outlets 47 are respectively arranged symmetrically with respect to the center line CL passing through the center of the vehicle width direction.

The defroster outlet 44 comprises a grille 50 having an air guidance portion 49 which can change the air orientation, in the range from an outer position, where cool air is directed to a side window 48 of the vehicle interior as indicated by the arrow a in FIG. 11, to an inner position where cool air is directed inward in the vehicle interior as indicated by the arrow b. On the periphery of the grille 50, a flange 52 which is pressed against the bottom surface of a top sealing material 51 is formed. The flange 52 is secured with the periphery of the grille-placing hole, thereby concealing the grille 50.

Figure 12:
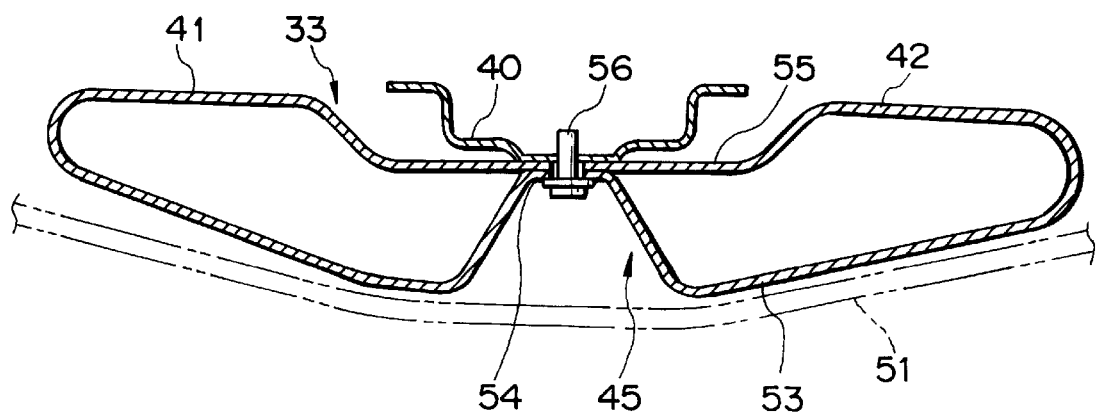
FIG. 12 is a cross section of FIG. 10 cut along the line E—E.

As shown in FIG. 12, the fixing portion 45 of the roof duct 33 is formed by concaving the bottom wall surface 53 of the roof duct 33 toward the vehicle exterior, i.e., upward. The fixing portion 45 is fixed, while the concave insertion end 54 abuts against the top wall 55 of the roof duct 33, to the bottom surface of the roof reinforcement 40 by a fixing member such as a grip clamp or a screw or the like.

Figure 13:
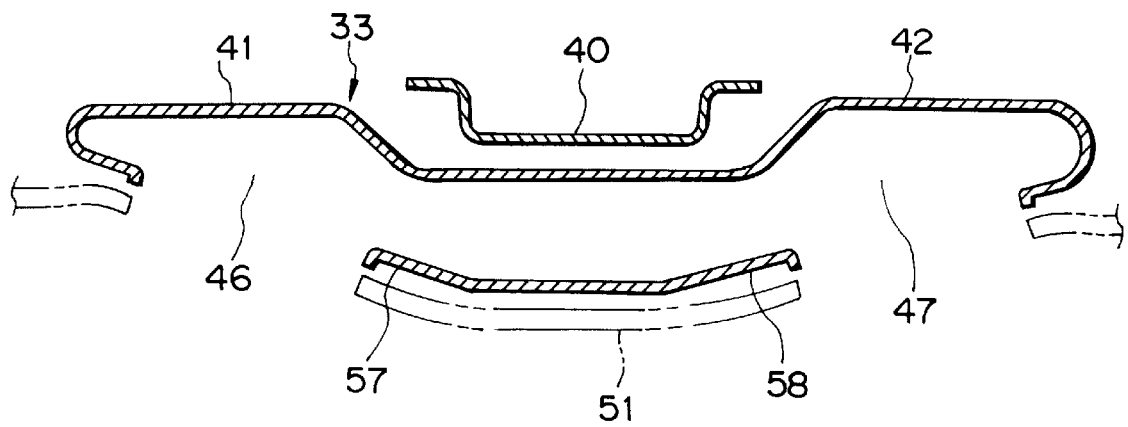
FIG. 13 is a cross section of FIG. 10 cut along the line F—F.

The first outlets 46 for the first rear seat 2 are formed on a slanted wall 57 aslant upward toward the vehicle front as shown in FIG. 13, provided on the bottom wall of the first expanded portion 41 which ejects air to the front of the vehicle interior, so that cool air is ejected obliquely forward from the first outlets 46, i.e., ejected to the rear surface of the first rear seat 2. The second outlets 47 for the second rear seat 3 are formed on a slanted wall 58 aslant upward toward the vehicle rear, provided on the bottom wall of the second expanded portion 42 which ejects air to the rear portion of the vehicle interior, so that cool air is ejected obliquely backward from the second outlets 47, i.e., ejected to the front surface of the second rear seat 3.

Figure 14:
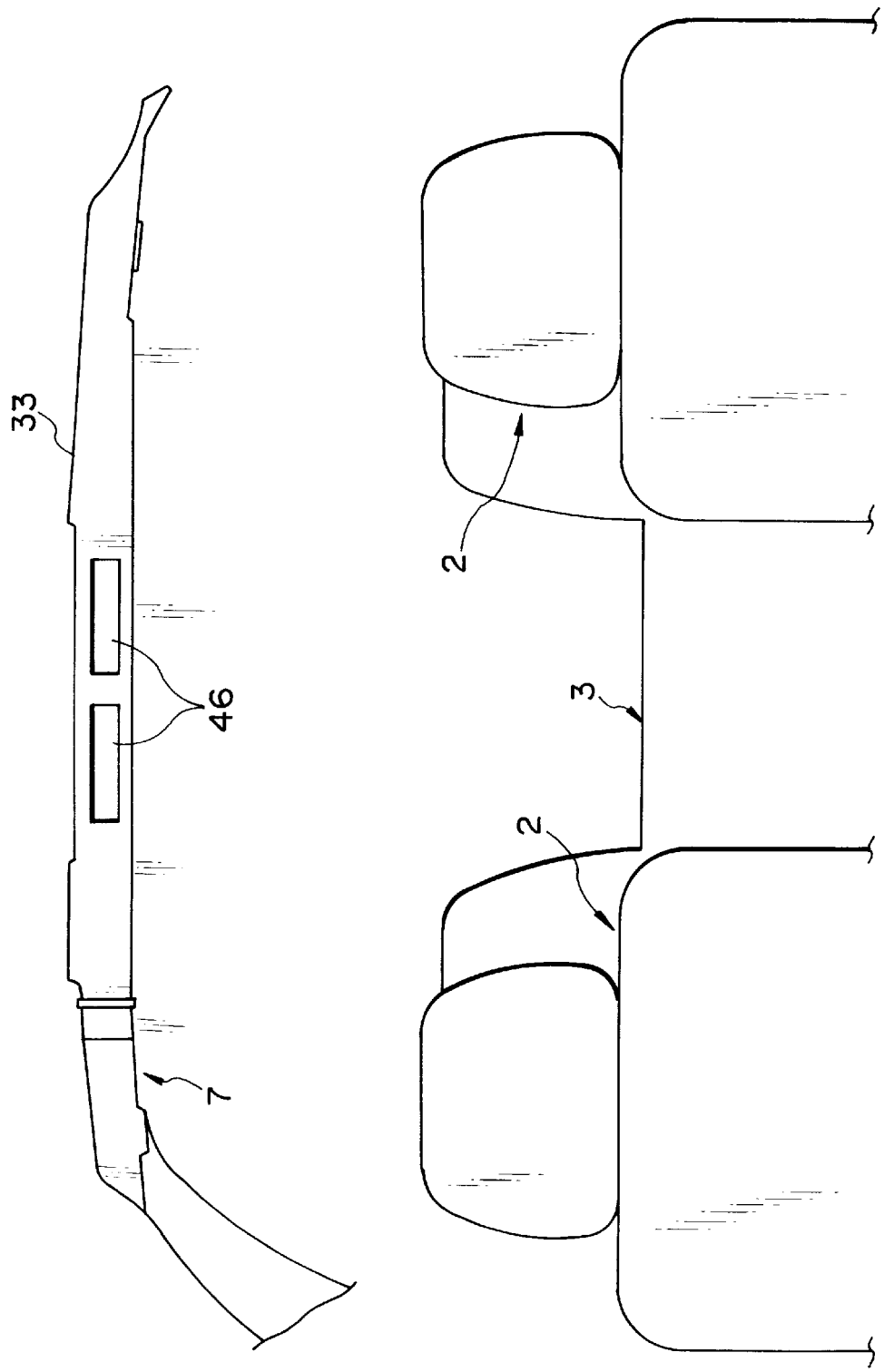
FIG. 14 is a front view of a vehicle showing an arrangement of the roof duct.

The first outlets 46 for the first rear seat 2 are arranged in the central portion of the vehicle width direction as shown in FIG. 14, so that cool air is ejected between the left and right separate-type first rear seats 2. Cool air, ejected from the second outlets 47 which are arranged on the back of the first outlets 46, is ejected to the center portion of the bench-type second rear seat 3. On the first and second outlets 46 and 47, grilles having air guidance portions for changing the cool-air ejection direction in the front-and-rear and left-and-right directions, are respectively provided.

With the above-described construction, when the heater unit 4 of the air conditioning unit 8 provided in the rear portion of the vehicle interior is started, heated air from the heater unit 4 flows inside the first to third ducts 12, 14 and 15 of the heater duct 6, and guided under the second rear seat 3 to the central portion of the vehicle in the vehicle width direction. After the heated air is guided forward, the air is ejected upward from the outlets 17 located on the floor to feet of passengers seated on the second rear seat 3 (see FIG. 1). As a result, the rear portion of the vehicle, which is away from the heating range of an air conditioning unit (not shown) provided in the vehicle front, is efficiently heated.

When the cooler unit 5 of the air conditioning unit 8 is started, cool air from the cooler unit 5 flows inside the vertical duct 29, side duct 31 and roof duct 33 of the cooler duct 7, and guided to the center portion of the vehicle interior through the upper portion of the vehicle passing between the first rear seat 2 and the second rear seat 3. Then, the air is ejected downward from the first and second outlets 46 and 47, efficiently cooling the rear portion of the vehicle interior.

As described above, according to the present embodiment, a vehicle having plural rows of seats e.g., three rows of seats 1 to 3 in the front-to-rear direction of the vehicle, comprises the cooler duct 7 for guiding cool air from the cooler unit 5 to the portion above and between the first rear seat 2 positioned on the second row of seats from the vehicle front and the second rear seat 3 positioned behind the first rear seat 2. The cooler duct 7 comprises the first outlets 46 for ejecting cool air to the first rear seat 2 side, and the second outlets 47 for ejecting cool air to the second rear seat 3 side. The first outlets 46 are formed in a position away from the seated area of the first rear seat 2. By virtue of this construction, it is possible to avoid direct cool-air ejection toward the back of the head of the passenger who is seated on the first rear seat 2. Also, it is possible to efficiently cool the rear portion of the vehicle interior with a simple construction.

More specifically, it is constructed such that cool air is ejected to the first and second rear seats 2 and 3 respectively from the first and second outlets 46 and 47, formed on the row of roof duct 33 provided on the lower surface of the roof panel 30. By virtue of this construction, cool air is more uniformly distributed and the wide area of the rear portion of the vehicle interior can be uniformly cooled without making the structure complicated as in the case of providing a plurality of ducts on the lower surface of the roof panel 30. Moreover, by forming the first outlets 46 away from the seated area of the first rear seat 2, direct cool-air ejection toward the back of the head of the passenger who is seated on the first rear seat 2 is avoided. Therefore, the problem of "uncomfortable feeling" of passengers due to the localized air flow ejected to the back of the head of the passenger can be surely prevented.

Moreover, according to the above-described embodiment, the first rear seat 2 positioned on the second row of seats from the vehicle front is a separate-type seat where the left and right seats are independent, and the first outlets 46 are arranged in the central portion of the roof duct 33 in the vehicle width direction. By virtue of this construction, a passenger can easily move from the front seat 1 or the first rear seat 2 to the second rear seat 3. Furthermore, cool air is ejected from the first outlets 46 to the middle of the first rear seat 2 provided separately in the left and right. By virtue of this construction, the rear portion of the vehicle interior is efficiently cooled, while preventing the problem of "uncomfortable feeling" of passengers due to the localized air flow ejected to the back of the passengers' heads.

Still further, taking into consideration of the fact that direct ejection of cool air from the front side of the passengers can positively provides comfortable cool air to passengers and can improve passengers' comfort without causing the "uncomfortable feeling," the second outlets 47 which ejects cool air to the front surface side of the bench-type second rear seat 3 situated in the last row of seats is arranged in the center portion of the vehicle width direction. Cool air, guided through the roof duct 33 to the center portion of the vehicle width direction, is ejected to the vehicle interior from the second outlets 46.

Furthermore, by virtue of adopting the above-described construction, it is possible to uniformly cool a wide area of the rear portion of the vehicle, which is away from the cooling range of an air conditioning unit provided in the vehicle front, without causing partial cooling in which cool air from the outlets circulates in the neighborhood of the cooler unit 5 whereby cooling only a part of the vehicle rear. Partial cooling occurs in a case where air outlets are provided near the cooler unit 5 on the side of the vehicle interior, i.e., in the right side of the vehicle interior. Particularly, the effect of adopting the above-described construction is significant because the aforementioned air conditioning unit 8, arranged in the rear portion of the vehicle, often employs an internal-air circulation type, in which heated air tends to circulate only in a part of the vehicle interior, rather than a fresh-air introducing type.

Furthermore, as described in the foregoing embodiment, in a case where the defroster outlets 44 for ejecting cool air toward the side window 48 are formed on the left and right sides of the roof duct 33 in the vehicle width direction, there is an advantage in that frost on the side window 48 is effectively removed by the cool air ejected from the defroster outlets 44. Particularly as described in the above embodiment, in the case of adopting the defroster outlets 44 having the grille 50 which includes the air guidance portion 49 for changing the air orientation, in the range from the outer position, where cool air is directed to a side window 48 of the vehicle interior, to the inner position where cool air is directed inward in the vehicle interior, it is possible to select, as necessary, either a cooler-oriented state where the orientation of cool air ejected from the defroster outlets 44 is directed inward in the vehicle interior or a defrost-oriented state where the air ejection is directed to the side window 48.

Moreover, according to the above-described embodiment, the cooler duct 6 comprises the vertical duct 29 extended upward from the cooler unit 5, the side duct 31 extended from the top end of the vertical duct 29 to the front side of the vehicle interior, and the roof duct 33 extended from the front end of the side duct 31 to the vehicle width direction. Cool air from the cooler unit 5 is guided through the vertical duct 29 to the upper portion of the vehicle interior, then guided toward the front side of the vehicle through the side duct 31, and further guided in the vehicle width direction through the roof duct 33 arranged above and between the first rear seat 2 and the second rear seat 3. By ejecting cool air from the first and second outlets 46 and 47, formed on the central portion of the roof duct 33 in the vehicle width direction, to the rear surface of the first rear seat 2 and the front surface of the second rear seat 3, it is possible to efficiently cool the rear portion of the vehicle interior with a simple construction.

Particularly as described in the foregoing embodiment, in a case where the vertical duct 29 of the cooler duct 7 is arranged along the pillar 9 provided in the most rear of the vehicle, the rear portion of the vehicle interior can be efficiently cooled without blocking the passengers' view. More specifically, even if the width (front-to-rear direction) of the D pillar 9 provided in the most rear of the vehicle is formed large, the view of the passengers seated on the seats 1 to 3 is not greatly affected. Therefore, the width of the D pillar 9 and the cooler duct 7 arranged along the D pillar 9 can be enlarged to reduce the flow resistance of cool air, while securing an enough opening area for the cooler duct 7, without negatively affecting the passengers' view. In addition, the strength of the D pillar 9 can be enhanced, thus the stability of the vehicle can be improved.

Moreover, as described in the foregoing embodiment, since the air conditioning unit 8, having the cooler unit 5, is provided between the lower portion of the D-pillar 9 provided in the most rear of the vehicle and the wheel housing 10 of the rear wheel, the air conditioning unit 8 can be appropriately arranged while efficiently utilizing the space provided on the side of the second rear seat 3 situated in the last row of seats. In addition, it is possible to secure space for arranging the rear door 11 in front of the air conditioning unit 8.

Furthermore, as described in the foregoing embodiment, in a case where the slide-type rear door 11 is arranged in front of the cooler unit 5, a larger open area can be secured compared to the case of using a hinged door. Therefore, passengers can easily get on and off the first and second rear seats 2 and 3.

Further, as described in the foregoing embodiment, in the vehicle having plural rows of seats 1 to 3 in the front-to-rear direction, the heater unit 4 is provided on the side of the second rear seat 3 in addition to the cooler unit 5, and the heater duct 6 is provided to guide the heated air from the heater unit 4 to the central portion of the vehicle width direction. By this construction, the air conditioning apparatus according to the present embodiment does not limit the type of cars where it can be installed, and can efficiently heat the rear portion of the vehicle such as one-box type vehicle or the like.

More specifically, by arranging the air conditioning unit 8, having the heater unit 4 and cooler unit 5, on the side of the second rear seat 3, it is possible to secure space for providing the rear door 11 in front of the air conditioning unit 8, i.e., on the side of the first rear seat 2 located in the central portion of the vehicle front-to-rear direction. Therefore, not only a vehicle having a rear door on only one side of the vehicle body, but also a vehicle having the rear door 11 on both sides of the vehicle body can utilize the air conditioning apparatus having the above-described heater unit 4 and heater duct 6 and so on to efficiently cool or heat the rear portion of the vehicle interior.

Furthermore, according to the above-described embodiment, the heater duct 6 is arranged under the rear seat 3 situated in the last row of seats in the vehicle interior, and the outlet 17 is formed on the heater duct 6 for ejecting heated air upward from the floor to the vehicle interior. By this construction, enough opening area of the heater duct 6 can be secured without affecting the space in the trunk room behind the rear seat 3. Therefore, heated air from the heater unit 4 can be smoothly supplied through the heater duct 6. Also, the floor of the trunk room can be made flat so as to efficiently utilize the trunk space.

Moreover, since heated air is ejected upward to the vehicle interior from the outlet 17 of the heater duct 6 situated in the central portion in the vehicle width direction, it is possible to uniformly heat a wide area of the rear portion of the vehicle, which is away from the heating range of an air conditioning unit provided in the vehicle front, without causing partial heating in which heated air from the heater unit 4 circulates in the neighborhood of the heater unit 4 whereby heating only a part of the vehicle rear. Partial heating occurs in a case where air outlets are provided near the heater unit 4 on the side of the vehicle interior, i.e., in the right side of the vehicle interior.

Further, according to the above-described embodiment, the heater duct 6 comprises: the first duct 12 extended downward from the heater unit 4 along the vehicle side wall; the second duct 14 extended from the bottom end of the first duct 12 to the central portion of the vehicle in the vehicle width direction, along the top surface of the floor panel 13; and a third duct 15 extended from the end portion of the second duct 14 toward the front portion of the vehicle. In the end portion of the third duct 15, the outlet 17 for ejecting heated air is formed. By this construction, the heater duct does not interfere with getting on or off the rear seats 2 and 3 as in a case where the heater duct is arranged along the upper and front surface portions of the rear wheel housing 10. Thus, heated air can be supplied to appropriate positions in the rear portion of the vehicle interior through the heater duct 6.

Furthermore, as described in the foregoing embodiment, a pair of branching parts 16 provided symmetrically with respect to the center line CL, are formed in the front portion of the third duct 15. In a case where the outlets 17 for ejecting heated air are provided at the end portion of the branching parts 16, heated air can be equally distributed by the branching parts 16 to the left and right of the vehicle width direction and ejected to the vehicle interior, while securing enough opening area of the third duct 15. By this, a wide area of the rear portion of the vehicle interior can be uniformly heated. In addition, there is also an advantage in that a child seat or the like may be fixed between the branching parts 16.

Moreover, in the foregoing embodiment, the sound proof member 18 is provided on the top surface of the floor panel 13, and the heater duct 6 is buried in the sound proof member 18. By spreading the rug 19 on the heater duct 6 and the sound proof member 18, the bottom surface of the vehicle interior can be made flat while securing space for arranging the heater duct 6. Accordingly, when the second rear seat 3 is removed and the place for the heater duct 6 is used as a trunk room, the storability of luggage can be effectively improved.

Furthermore, in the above-described vehicle where plural rows of seats 1 to 3 are arrayed in the front-to-rear direction of the vehicle, the hollow 23 is formed on the floor panel 13 in the rear portion of the vehicle interior to stow the seat bottom and seat back of the second rear seat 3 integrally when the seat is pushed back. The air conditioning unit 8 is arranged in the side of the hollow 23. By virtue of this construction, the air conditioning unit 8 can be arranged in the rear portion of the vehicle interior without causing troubles to stowing the second rear seat 3 in the hollow 23 by pushing the seat back.

The present invention is not limited to the above embodiments and various changes and modifications can be made within the spirit and scope of the present invention. Therefore, to appraise the public of the scope of the present invention, the following claims are made.

What is claimed is:

1. A vehicle air conditioning apparatus provided in a vehicle where plural rows of seats are arrayed in a front-to-rear direction of the vehicle, comprising:

a cooler duct guiding cool air from a cooler unit of an air conditioning unit to a portion above and between a first rear seat positioned on a second row of seats from a vehicle front and a second rear seat positioned behind the first rear seat, the first rear seat being a separated seat in which left seat and right seat portions are divided by a space, wherein a first outlet ejecting cool air to the first rear seat side and a second outlet ejecting cool air to the second rear seat side are formed on the cooler duct, and the first outlet is arranged in a position away from the left seat and right seat portions of the first rear seat and the cool air is ejected from the first outlet in the direction of the space.

2. The vehicle air conditioning apparatus according to claim 1, wherein said space between the left seat and right seat portions and the first outlet are arranged in a central portion of the vehicle inside area in a vehicle width direction.

3. The vehicle air conditioning apparatus according to claim 1, wherein the second outlet ejecting cool air to a front surface side of the second rear seat situated in a last row of seats in the vehicle is arranged in the central portion of the vehicle inside area in the vehicle width direction.

4. The vehicle air conditioning apparatus according to claim 1, wherein a defroster outlet ejecting cool air to a side window is formed on the cooler duct.

5. The vehicle air conditioning apparatus according to claim 4, wherein the cooler duct comprises:

a vertical duct extended upward from the cooler unit;

a side duct extended forward to a front side of the vehicle from a top end of the vertical duct; and a roof duct extended in the vehicle width direction from a front end of the side duct; and wherein said first outlet is arranged in a central portion of the roof duct in the vehicle width direction, and the defroster outlet is arranged in both ends of the roof duct in the vehicle width direction.

6. The vehicle air conditioning apparatus according to claim 1, wherein the air conditioning unit is arranged between a lower portion of a pillar and a wheel housing of a rear wheel.

7. The vehicle air conditioning apparatus according to claim 6, wherein the vertical duct is arranged along a pillar located in the rear of a wheel housing of a rear wheel.

8. The vehicle air conditioning apparatus according to claim 6, wherein the air conditioning unit is provided in the rear of a slide-type rear door.

9. The vehicle air conditioning apparatus according to claim 1, wherein the air conditioning unit further comprises a heater unit and a heater duct guiding heated air from the heater unit to a central portion in the vehicle width direction;

the cooler unit and the heater unit are formed integrally, the air conditioning unit is arranged between a wheel housing located in the second rear seat side and a lower end of a pillar located in the rear of a wheel housing of a rear wheel and in the rear most part of the vehicle body, the cooler duct extends upward along a pillar located in the rear most part of the vehicle body from the cooler unit and guides cool air generated from the cooler unit to an upper position between the first rear seat and the second rear seat located in the rear of the first rear seat, and the heater duct extends forward and downward along a side wall of the vehicle body from the heater unit and guides heated air generated from the heater unit to a lower position between the first rear seat and the second rear seat located in the rear of the first rear seat.

10. The vehicle air conditioning apparatus according to claim 9, wherein the heater duct is extended in the vehicle width direction, while passing under the rear seat situated in the rear most part of the vehicle inside area, and wherein an outlet ejecting heated air upward from a vehicle floor is provided to the heater duct.

11. The vehicle air conditioning apparatus according to claim 1, wherein said first outlet is arranged in a position corresponding to the space between the left seat and right seat portions.

12. A vehicle air conditioning apparatus provided in a vehicle where plural rows of seats are arrayed in a front-to-rear direction of the vehicle, comprising:

a cooler duct guiding cool air from a cooler unit of an air conditioning unit to a portion above and between a first rear seat positioned on a second row of seats from a vehicle front and a second rear seat positioned behind the first rear seat, wherein the air conditioning unit comprises a heater unit and a heater duct guiding heated air from the heater unit, the cooler unit and the heater unit are formed integrally, the air conditioning unit is arranged between a wheel housing located in the second rear seat side and a lower end of a pillar located in the rear of a wheel housing of a rear wheel and in the rear most part of the vehicle body, the cooler duct extends upward along a pillar located in the rear most part of the vehicle body from the cooler unit and guides cool air generated from the cooler unit to an upper position between the first rear seat and the second rear seat located in the rear of the first rear seat, and the heater duct extends forward and downward along a side wall of the vehicle body from the heater unit and guides heated air generated from the heater unit to a lower position between the first rear seat and the second rear seat located in the rear of the first rear seat.

13. The vehicle air conditioning apparatus according to claim 12, wherein the heater duct is extended in the vehicle width direction, while passing under the rear seat situated in the rear most part of the vehicle inside area, and wherein an outlet ejecting heated air upward from a vehicle floor is provided to the heater duct.

* * * * *